(12) United States Patent
Okayasu

(10) Patent No.: US 8,641,213 B2
(45) Date of Patent: Feb. 4, 2014

(54) MIRROR

(76) Inventor: Kenji Okayasu, Minato-ku (JP)

( * ) Notice: Subject to any disclaimer, the term of this patent is extended or adjusted under 35 U.S.C. 154(b) by 133 days.

(21) Appl. No.: 13/376,481

(22) PCT Filed: Mar. 3, 2010

(86) PCT No.: PCT/JP2010/053441
§ 371 (c)(1),
(2), (4) Date: Dec. 6, 2011

(87) PCT Pub. No.: WO2010/143456
PCT Pub. Date: Dec. 16, 2010

(65) Prior Publication Data
US 2012/0087027 A1 Apr. 12, 2012

(30) Foreign Application Priority Data
Jun. 8, 2009 (JP) .................................. 2009-136775

(51) Int. Cl.
*G02B 7/182* (2006.01)

(52) U.S. Cl.
USPC ........................................................ 359/871

(58) Field of Classification Search
USPC .................................. 359/871, 872, 847, 840
See application file for complete search history.

(56) References Cited

U.S. PATENT DOCUMENTS 3,610,738 A * 10/1971 Bochmann ..................... 359/847
3,972,600 A * 8/1976 Cobarg ......................... 359/847

FOREIGN PATENT DOCUMENTS

| JP | 43-28126 Y1 | 11/1968 |
| JP | 55-177768 U | 12/1980 |
| JP | 4-125763 U | 11/1992 |
| JP | 8-248214 A | 9/1996 |
| JP | 10-165273 A | 6/1998 |

OTHER PUBLICATIONS

Palisoc, A.L., "Large Telescope Using a Holographically-Corrected Membrane Mirror," Final Report to the NASA Institute for Advanced Concepts, LTR-00-AP-021, Nov. 2000.

* cited by examiner

*Primary Examiner* — Euncha Cherry
(74) *Attorney, Agent, or Firm* — Chapman and Cutler LLP

(57) ABSTRACT

There is provided a high-performance mirror which is capable of being varied between a plane mirror and a concave mirror. The mirror comprises a base (1), a mirror holder (2), a mirror surface sheet (12) and a back sheet (13) both capable of varying their curvature and retained in a spaced-apart relation by the mirror holder (2) to define an air-tight space between the sheets, the back sheet (13) being deformed from its center to reduce the pressure in the space, the mirror surface sheet being deformed into a concave spherical surface by a difference between the reduced pressure and the atmospheric pressure thereby to vary the curvature thereof.

2 Claims, 3 Drawing Sheets

MIRROR

FIELD OF THE INVENTION

This invention relates to a mirror for use in applying makeup or shaving, and more particularly, to such a mirror capable of being used as a plane mirror or a concave mirror.

BACKGROUND OF THE INVENTION

Use of a mirror has been indispensable to applying makeup or shaving. A plane mirror is generally used for those purposes, but a concave mirror may be used for magnification.

To this end, a double-sided mirror having a plane mirror on one side and a concave mirror on the other side has been used as a mirror for washrooms in hotels or the like for a long time.

Patent document 1 discloses a hand mirror comprising a flexible mirror sheet secured at its peripheral edge to a frame, a support rod fixed to the mirror sheet at its center, an operating handle mounted on the frame for rotation, and an adjusting mechanism for moving vertically the support rod relative to the flexible mirror sheet when the operating handle is rotated, the vertical movement of the support rod permitting the flexible mirror sheet to be deformed, thereby varying curvature of the flexible mirror sheet and thus, changing from a plane mirror to a concave mirror, or from the plane mirror to a convex mirror. In patent document 1, a delicate difference in curvatures is made at a point where a force is exerted directly on the mirror sheet and at a location where no force is applied to the mirror sheet to result in distortion of the mirror face. In addition, the disclosed mirror has the disadvantage that, due to the fact that curvature is varied mechanically, the variations of curvature are stepwise effected and therefore, it is hard to select any suitable curvature.

Non-patent document 1 discloses a technology to utilize, for a large-scale reflector, a flexible mirror sheet sealedly retained at its periphery and deformed into a concave mirror or convex mirror by gaseous pressure. According to this technology, there is a difference from the mirror disclosed in Patent document 1, in that a negative or positive pressure is applied to the mirror sheet to vary its curvature and therefore, the mirror has no distortion, and variations of curvature are continuously effected. However, a large-scale pressurizing or pressure reducing device is required to apply gas directly to the mirror sheet and therefore, this technology cannot be applied to a hand mirror.

PRIOR ART DOCUMENT

Patent document 1: Japanese patent application publication Heisei 10-165273

Non-patent document 1: Arthur L. Palisoc (L' Garde, Inc.), "Large Telescope Using a Holographically-Corrected Membrane Mirror", [Online], Jun. 6-7, 2000, [locked up on Jun. 3, 2009], internet <URL: www.niac.usra.edu/files/studies/final report/416Palisoc.pdf>

SUMMARY OF THE INVENTION

The invention adopts a mechanism capable of varying curvature of a mirror sheet without contacting it by utilization of gaseous pressure similarly to the idea in non-patent document 1, but an object of the invention is to provide, as a result of study about an easily usable mirror, a mirror capable of use as a plane mirror or a concave mirror produced by providing curvature-variable mirror and back sheets in an opposite relation to define an air-tight space therebetween, both the mirror and back sheets being capable of varying their curvature, by varying pressure in the air-tight space.

This object of the invention is achieved by providing a mirror comprising a base, a mirror sheet and a back sheet both capable of varying their curvature, a mirror holder for air-tightly retaining the mirror sheet and the back sheet parallel to each other in a spaced-apart relation at peripheral edges of the sheets to define an air-tight space between the sheets, means for connecting the back sheet at its center to the base, means for moving upwardly the mirror holder relative to the base, the upward movement of the mirror holder permitting the back sheet to be deformed into a downward convex configuration to reduce the pressure in the space between the mirror sheet and the back sheet so that the difference between the reduced pressure and the atmospheric pressure permits the mirror sheet to be depressed into a curved surface, thereby providing a concave mirror.

According a preferred embodiment of the invention, there is provided a mirror comprising a shallow dish-like base, a mirror sheet and a back sheet both capable of varying their curvature, a mirror holder received rotatively within the base for air-tightly retaining the mirror sheet and the back sheet parallel to each other in a spaced-apart relation at peripheral edges of the sheets to define an air-tight space between the sheets, means for connecting the back sheet at its center to the base, and means for moving upwardly the mirror holder relative to the base, the moving means comprising threadedly engaging means between the mirror holder and the base, the connecting means including a tension plate secured at its one end to the back sheet and mounted at its other end in the base for rotation, actuation of the threadedly engaging means permitting the mirror holder to be moved out of or be retracted into the base, thereby deforming the back sheet from its center so as to reduce the pressure in the air-tight space so that the difference between the reduced pressure and the atmospheric pressure permits the mirror sheet to be depressed into a curved surface, thereby providing a concave mirror.

A further object of the invention is to provide a mirror comprising a base, a mirror sheet and a back sheet both capable of varying their curvature, a mirror holder received rotatively within the base for air-tightly retaining the mirror sheet and the back sheet parallel to each other in a spaced-apart relation at peripheral edges of the sheets to define an air-tight space between the sheets, and means for pulling downwardly the back sheet at its center relative to the mirror holder, the downward pull of the back sheet resulting in reduction in pressure in the space between the mirror sheet and back sheet so that the difference between the reduced pressure and the atmospheric pressure permits the mirror sheet to be depressed into a curved surface, thereby providing a concave mirror.

According to a preferred embodiment of the invention, the means for pulling downwardly the back sheet includes a tension plate secured to the back sheet at its center and having at a lower end a cam follower, and an operating bar slidably mounted radially in the base and having a cam engaging the cam follower.

According to a further preferred embodiment of the invention, there is provided a valve mechanism for communicating the space between the mirror sheet and the back sheet with the atmosphere when the mirror is used as a plane mirror in which the mirror sheet is flat, and for cutting off the communication of the space with the atmosphere in order to bring the space into a state of being air-tight when the mirror is to be used as a concave mirror.

In the described arrangement of the invention, there is provided a mirror with no distortion that is lightweight and simple in structure, and has the advantage of simple control to adjust the plane mirror and the concave mirror to a desired curvature, because the mirror and back sheets are spaced apart in a parallel relation to retain air-tightly a space between them, and the back sheet is deformed to vary the pressure in the space, thereby being capable of varying a curvature of the mirror. As a result, the curvature of the curved surface varies smoothly throughout the mirror sheet.

PREFERRED EMBODIMENTS FOR CARRYING OUT THE INVENTION

Figure 1:
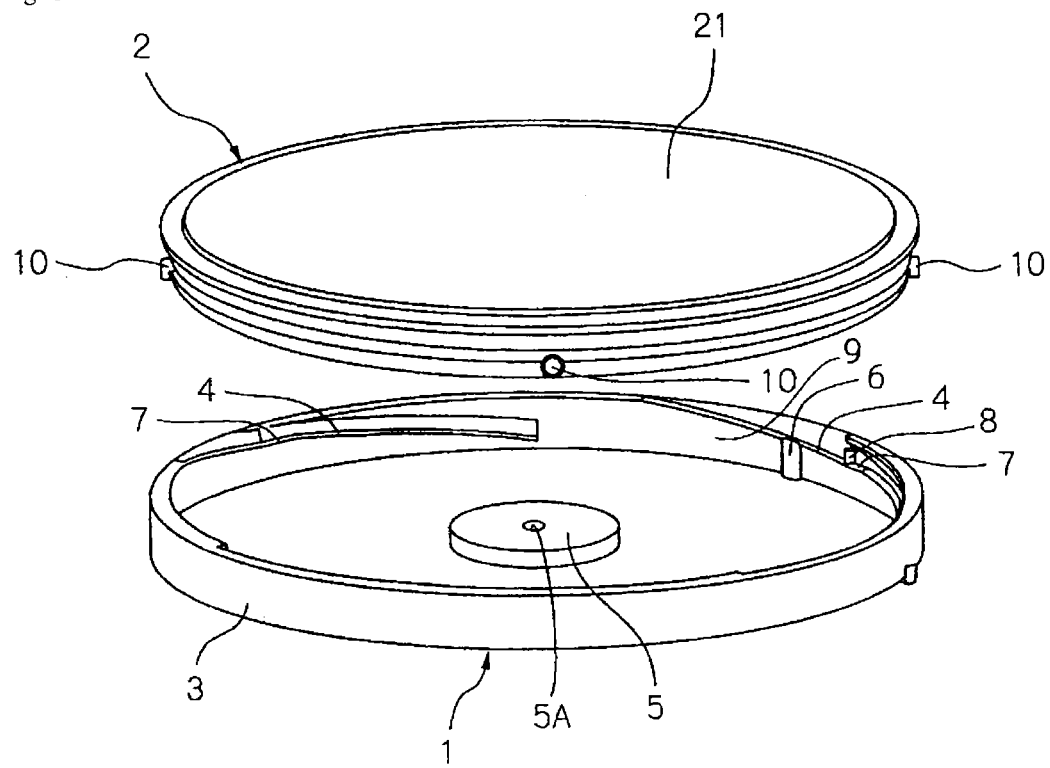
FIG. 1 is an exploded perspective view of a mirror according to one embodiment of the invention.

Referring to FIGS. 1 to 4 in the drawings, there is shown a mirror according to one embodiment of the present invention, and comprising a mirror body defined by a dish-like base 1 and a mirror holder 2 received rotationally in the base 1. The mirror body is made from any suitable material such as synthetic resin, for example.

Helical grooves 4 comprise four right-hand internal threads formed in a rising circumferential wall 3 of the base 1 at a pitch of 90 degrees. The base 1 has a bottom wall with an inwardly protrusive portion 5 to define a central recess on the bottom surface of the base 1.

The mirror holder 2 has a circumferential side wall having four circular projections 10 provided on an outer peripheral surface thereof at a pitch of 90 degrees identical to that of the helical grooves 4. The mirror holder 2 is received within the base 1 with the projections each engaged with the helical groove 4. When the mirror holder 2 is rotated counterclockwise relative to the base 1 around its central axis C, the circular projections 10 move along the helical grooves 4 so that it comes upwardly out of the base 1. On the contrary, when mirror holder 2 is rotated clockwise relative to the base 1, it is retracted into the base 1.

Each of the helical grooves 4 has a landing portion 7 at an uppermost position thereof. A stopper 8 is provided on one of the helical grooves 4 for abutting the circular projection 10 engaging with the helical groove 4 to stop any further rotation of the mirror holder 2.

Figure 2:
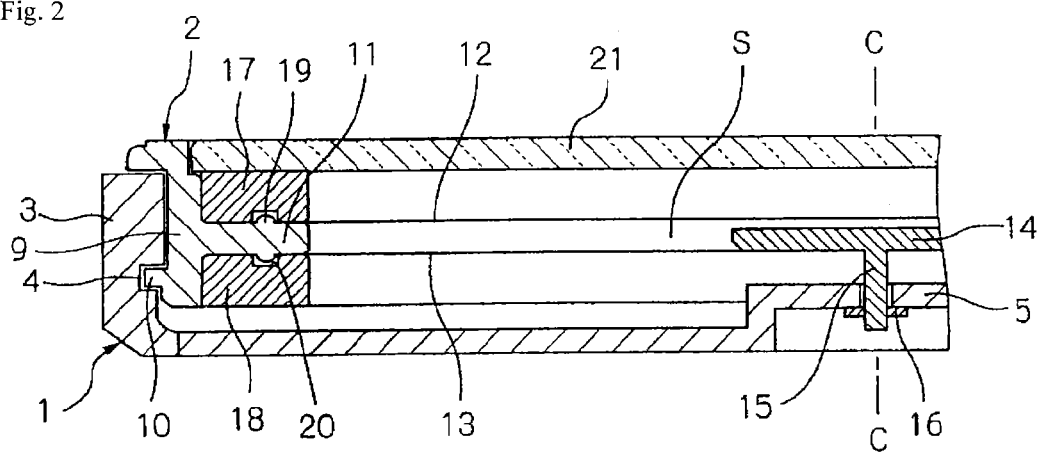
FIG. 2 is a fragmental enlarged view in section of the mirror according to the invention when used as a plane mirror.

The mirror holder 2 has a circular flange 11 protruding radially inwardly from an inner surface of the circumferential side wall 9 as shown in FIG. 2. Mirror sheet 12 and a back sheet 13 capable of varying curvature respectively, are secured at their peripheral edge portions to the circular flange 11 with an air-tight space S defined between the sheets 12 and 13. More particularly, in order to avoid any sagging of the sheets 12 and 13, an upper pressing ring 17 presses the peripheral edge portion of the mirror sheet 12 against the flange 11 while a lower pressing ring 18 presses the peripheral edge portion of the back sheet 13 against the flange 11. In addition, the peripheral edge portions of the mirror sheet 12 and back sheet 13 are clamped between circumferentially extending protrusions 19 on the flange 11 and corresponding circumferential grooves 20 formed in the upper and lower pressing rings 17, 18, which engage each other. The upper and lower pressing rings are fixed to the flange 11 with screws. Thus, the mirror sheet 12 and back sheet 13 are fixedly secured to the mirror holder without any sagging and the air-tightness is maintained between the sheets.

As shown in FIG. 2, a tension plate 14 is secured to the upper surface of the back sheet 13 and has a rod 15 extending through an aperture in the back sheet 13 at its center. The rod 15 on the tension plate 14 is rotatably inserted into an opening 5A formed in the protrusive portion 5 of the bottom wall of the base 1, and retained in the base 1 by a snap ring 16 fitted over the rod to prevent it from coming out of the opening 15A. A gap between the aperture in the back sheet 13 and the rod 15 may be sealed with any suitable adhesive. It is apparent that the tension plate 14 may be adhered to the lower surface of the back sheet 13.

Reference numeral 21 indicates a transparent cover mounted on the mirror holder 2 which serves to prevent a mirror surface from becoming dirty or from fogging. Preferably, the transparent cover may be made of acrylic resin sheet and may have anti-reflective films on both the surfaces thereof.

In the case where the mirror is used as a concave mirror, the mirror holder 2 is rotated counterclockwise relative to the base 1 so that it moves upwardly but the tension plate 14 remains fixed to the base 1 and therefore, the back sheet 13 is deformed to a configuration of downward convex to result in reduction in the pressure in the space S between the mirror sheet 12 and the back sheet 13. Thus, the mirror sheet 12 is depressed into a completely curved surface to function as a concave mirror. In this embodiment, when the circular projection 10 is on the landing portion 7 of the helical groove 4 at its uppermost position, mirror sheet 12 is maintained in the configuration of a concave mirror. Magnifying power of the concave mirror can be varied by adjusting an amount of upward movement of the mirror holder 2 relative to the base 1.

The mirror sheet 12 capable of varying curvature may comprise a transparent polyester film having a thickness of 5 to 50 μm and a mirror film consisting of deposited aluminum or silver on an inner surface of the polyester film The back sheet 13 capable of varying curvature may also comprise polyester film or any other synthetic resin film having the same thickness as the mirror sheet. The base 1 and mirror holder 2 may comprise molded products of lightweight metals as well as the above mentioned synthetic resins.

Figure 4:
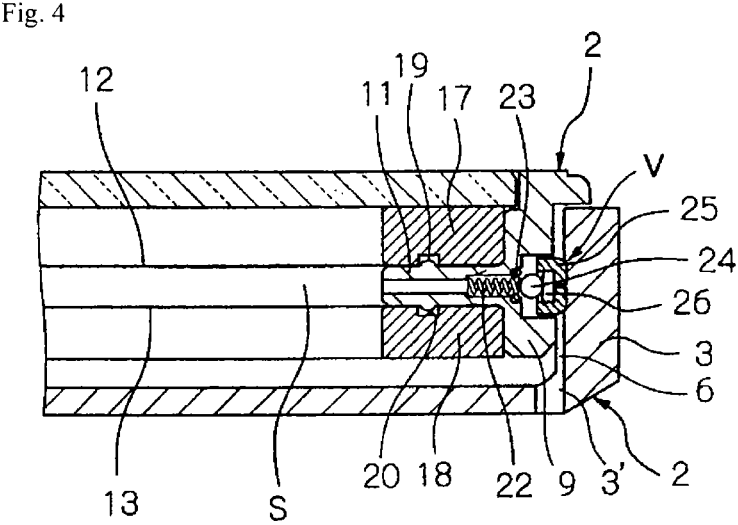
FIG. 4 is a fragmental enlarged view in section of the mirror according to the invention illustrating a valve mechanism mounted in the mirror.

FIG. 4 illustrates a valve mechanism V for bringing the air-tight space S defined between the mirror sheet 12 and the back sheet 13 to atmospheric pressure when the mirror according to the present invention is in a position of a plane mirror.

The mirror according to the invention is usually utilized or stored as a plane mirror. If, under these circumstances, the atmospheric temperature rises or the atmospheric pressure varies, it is necessary to prevent air in the air-tight space from expanding or constricting.

As can be seen in FIG. 4, the valve mechanism V is mounted in the circumferential side wall of the mirror holder 2 and comprises a ball valve body 24 located in a stepped bore 11' extending from the circumferential side wall into the flange 11 and O-ring 23 adapted to serve as a valve seat for the ball valve body 24. A spring 22 is located in the bore 11' and has one end abutting an innermost step in the bore and another end abutting the ball valve body 24 to act upon it. A rubber cap 25 is fitted in an outermost portion of the bore with a slight clearance defined between the bore portion and the cap. A rubber sealing seat 26 is built into the cap 25 and abuts the ball valve body 24.

Figure 3:
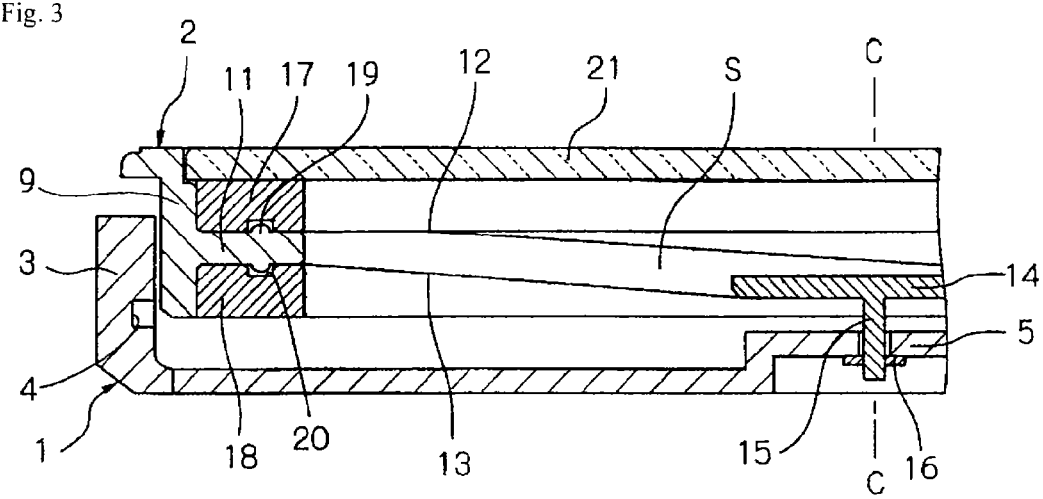
FIG. 3 is a fragmental enlarged view in section of the mirror according to the invention when used as a concave mirror.

FIG. 4 illustrates a state of the plane mirror in which the mirror holder 2 is retracted into the base 1. In this state, the rubber cap 25 is in a vertical groove 6 in the base 1. The ball valve body 24 is moved away from the O-ring 23 to a valve-opened position under the action of spring 22, in which the space S communicates through an air passage 3' in the base 1 and the clearance around the cap 25 with the atmosphere. Thus, variations in atmospheric pressure and temperature result in no deflection of the mirror surface. As the mirror holder 2 is rotated counterclockwise relative to the base 1, the cap 25 disengages from the vertical groove 6 and then engages the inner surface of the rising circumferential wall 3 so that it is pushed radially inwardly to seat the ball valve body 24 onto the O-ring 23 against the action of the spring 22, thereby bringing the ball valve body into its closed position. The space S is again brought into the condition of being air-tight, in which, if the back sheet 3 is deformed into the downward concave as shown in FIG. 3, the mirror sheet 12 is correspondingly deformed into the concave so that it changes to a state of a concave mirror.

Figure 5:
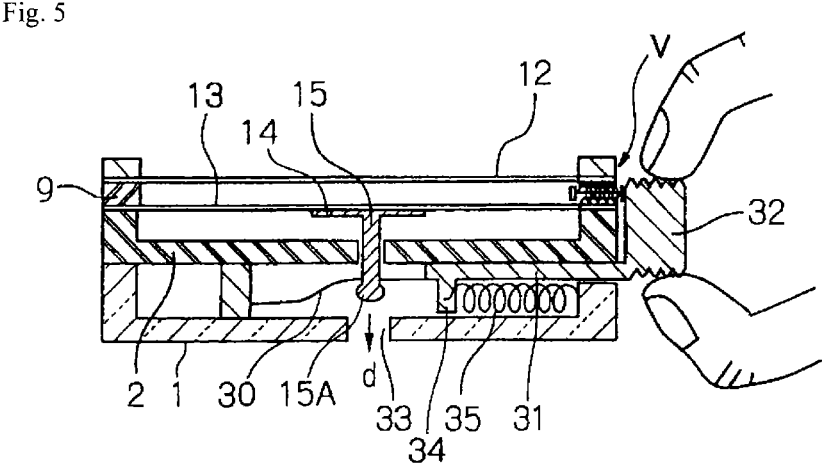
FIG. 5 is a sectional view of an alternative embodiment of the mirror according to the invention.
Figure 6:
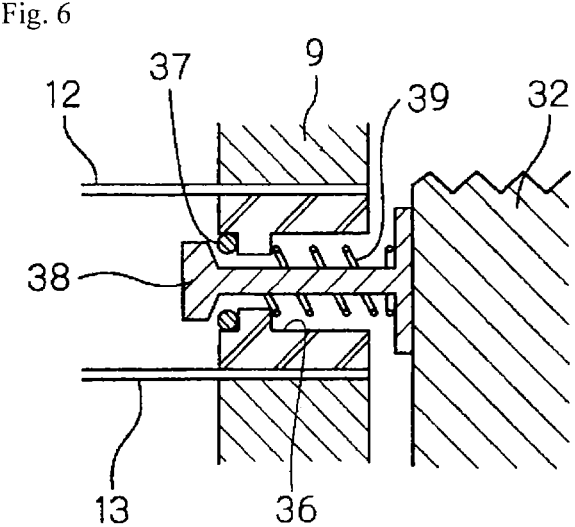
FIG. 6 is an enlarged view in section of a valve mechanism mounted in the mirror according to the invention.

FIGS. 5 and 6 illustrate another embodiment of the invention. In FIG. 5, a mirror of this embodiment comprises a mirror holder 2, a base 1, and mirror and back sheets 12 and 13 capable of varying curvature. The mirror sheet 12 and the back sheet 13 are air-tightly or water-tightly retained at their peripheral edge portions in a circumferential wall 9 in a given spaced-apart relation. The mirror sheet 12 and the back sheet 13 are desirably retained in tension in order to prevent them from sagging. To this end, both the sheets are preferably secured to the circumferential portion of the mirror holder in the same manner as in the first embodiment of the invention. The back sheet 13 is provided with a tension plate 14 secured at a center of the back sheet 13, the tension plate 14 including a rod or actuating rod 15 extending downwardly therefrom, and having at its lower end an enlarged cam follower 15A. By pulling downwardly the actuating rod 15, the back sheet 13 is curved downwardly to generate negative pressure in the air-tight space, so that mirror sheet 12 is deformed into a downward concave configuration by the atmospheric pressure thereon.

As shown in FIG. 5, there is provided means for pulling the actuating rod 15a, comprising an operating bar 31 having a cam 30 engaging the cam follower 15A. The operating bar 31 extends through a side wall of the base 1 and has a knob 32 on the outer side of the mirror. The cam 30 includes a low horizontal portion, a portion inclined from the horizontal portion toward the left in FIG. 5, and a high horizontal portion. The cam 30 may be in the form of a slide groove in which the cam follower 15A is received. An opening of escape 33 is provided in the base 1 in alignment with the actuating rod 15 to pass through the base. There is also provided a spring 35 abutting at its one end a stop plate 34 on the operating bar 31, and abutting at its other end an inner peripheral portion of the base 1 usually to bias radially outwardly the operating bar 31.

As can be seen in FIG. 6, a valve mechanism V is provided in the circumferential side wall 9 of the mirror holder 2 and the knob 32 of the operating bar 31 cooperates with the valve mechanism V for its opening or closing. The valve mechanism V comprises a stepped bore 36 formed in the circumferential wall 9, an O-ring 37 fixedly secured to the bore 36, a valve body 38, and a spring 39 for urging radially outwardly the valve body 38 toward the O-ring 37. The spring 39 is located in the bore 36 with a clearance defined between an inner wall of the bore and the spring.

As shown n FIG. 6, the knob 32 is grasped with the fingers to pull the operating bar 31 to the right so that the actuating rod 15 is gradually pulled downwardly due to engagement of the cam 30 with the cam follower 15A thereof. Thus, the back sheet 13 is brought into a downward convex configuration. Simultaneously with the pulling of the knob 32, the action of the spring 39 permits the valve body 38 to engage the valve seat 37, thereby cutting the space between the mirror sheet 12 and the back sheet 13 off from the atmosphere. The deformation of the back sheet 13 into the downward convex configuration results in reduction in pressure in the space so that the mirror sheet 12 is deformed to present a concave mirror. Thus, the mirror according to the invention can be used as a concave mirror. By releasing the knob 32, the concave mirror can be returned to the configuration of a plane mirror as shown in FIG. 5.

The release of the knob 32 permits the operating bar 31 to be returned under the action of the spring 35 to a position in which it abuts the valve body 38. The abutment of the knob 32 with the valve body 38 permits the valve body 38 to be urged radially inwardly against the action of the spring 39, thereby moving away from the O-ring 37. Thus, the space communicates through the clearance around the spring with the atmosphere. When the mirror is in the state of a plane mirror, the latter is not subject to any effect due to expansion or constriction of air in the space between the sheets.

The mirror according to the embodiments as described above, provides a plane mirror, but by modifying a mechanism for deforming the back sheet, it is possible to provide a mirror capable of being used as a convex mirror. A combination of a plane mirror and a convex mirror is provided.

Means for pulling the actuating rod 15 may be omitted, and instead, the actuating rod 15 may be directly grasped with the fingers for operation.

What is claimed is:

1. A mirror comprising
a shallow dish-like base,
a mirror sheet and a back sheet both capable of varying their curvature,
a mirror holder received rotatively within the base for air-tightly retaining the mirror sheet and the back sheet parallel to each other in a spaced-apart relation at peripheral edges of the mirror and back sheets to define an air-tight space between the mirror and back sheets,
means for connecting the back sheet at its center to the base, and
means for moving upwardly the mirror holder relative to the base, the moving means comprising threadedly engaging means between the mirror holder and the base, the connecting means including a tension plate secured at its one end to the back sheet and mounted at its other end in the base for rotation, actuation of the threadedly engaging means permitting the mirror holder to be moved outwardly relative to the base, thereby deforming the back sheet from its center so as to reduce the pressure in the air-tight space so that the difference between the reduced pressure and the atmospheric pressure permits the mirror sheet to be depressed into a curved surface, thereby providing a concave mirror.

2. A mirror according to claim 1, further comprising
a valve mechanism for communicating the space between the mirror sheet and the back sheet with the atmosphere when the mirror is used as a plane mirror in which the mirror sheet is flat, and for cutting off the communication of the space with the atmosphere in order to bring the space into a state of being air-tight when the mirror is to be used as a concave mirror.

* * * * *